(12) United States Patent
Granick et al.

(10) Patent No.: US 7,470,449 B2
(45) Date of Patent: Dec. 30, 2008

(54) POLYMER FILMS

(75) Inventors: Steve Granick, Champaign, IL (US); Svetlana A. Sukhishvili, Maplewood, NJ (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 614 days.

(21) Appl. No.: 10/852,090

(22) Filed: May 24, 2004

(65) Prior Publication Data

US 2004/0214002 A1 Oct. 28, 2004

Related U.S. Application Data

(62) Division of application No. 09/715,870, filed on Nov. 15, 2000, now Pat. No. 6,740,409.

(51) Int. Cl.
*B05D 3/00* (2006.01)
*B05D 7/00* (2006.01)

(52) U.S. Cl. .............. 427/212; 427/214; 427/352; 427/353

(58) Field of Classification Search ............ 427/212, 427/214, 352, 353
See application file for complete search history.

(56) References Cited

U.S. PATENT DOCUMENTS

| | | | |
|---|---|---|---|
| 3,648,845 A | 3/1972 | Riley | |
| 4,539,061 A | 9/1985 | Sagiv | |
| 4,861,818 A | 8/1989 | Timmerman et al. | |
| 5,208,111 A | 5/1993 | Decher et al. | |
| 5,518,767 A | 5/1996 | Rubner et al. | |
| 5,536,354 A | 7/1996 | Akaike et al. | |
| 5,536,573 A | 7/1996 | Rubner et al. | |
| 5,618,622 A | 4/1997 | Gillberg-Laforce et al. | |
| 5,700,559 A | 12/1997 | Sheu et al. | |
| 5,711,915 A | 1/1998 | Siegmund et al. | |
| 5,716,709 A | 2/1998 | Ferguson et al. | |
| 5,780,148 A | 7/1998 | Ohtake et al. | |
| 5,807,636 A | 9/1998 | Sheu et al. | |
| 5,827,531 A | 10/1998 | Morrison et al. | |
| 5,837,377 A | 11/1998 | Sheu et al. | |
| 5,882,785 A | 3/1999 | Hollins et al. | |
| 5,897,918 A | 4/1999 | Singh et al. | |
| 5,925,444 A | 7/1999 | Katsumura et al. | |
| 6,613,875 B1 * | 9/2003 | Ghadiri ............... 530/321 | |
| 2004/0077528 A1 * | 4/2004 | Steiner et al. .......... 514/3 | |

FOREIGN PATENT DOCUMENTS

WO WO 91/16362 10/1991

OTHER PUBLICATIONS

F. Albert Cotton and Geoffrey Wilkinson, "*The Hydrogen Bond, Hydrates, Hydrogen Ions, and Acids*", Advanced Inorganic Chemistry, 5th Edition, John Wiley & Sons, 1988, pp. 90-94.
Benjamin, I.; Hong, H.; Avny, Y.; Davidov, D.; Neumann, R. *Journal of Materials Chemistry* 1998, 8(4), 919-924.
Cho, J.; Caruso, F. *Macromolecules* 2003, 36, 2845-2851.
Sukhishvili, S.A.; Granick, S. *Macromolecules* 2002, 35, 301-310.
Sukhishvili, S.A.; Granick, S. *J. Am. Chem. Soc.* 2000, 122, 9550-9551.
Wang, L.Y.; Fu, Y.; Wang, Z.Q.; Fan, Y.; Zhang, X. *Langmuir* 1999, 15, 1360-1363.
Yoo, D.; Shiratori, S.S.; Rubner, M.F. *Macromolecules* 1998, 31, 4309-4318.
Cheung, J.H.; Stockton, W.B.; Rubner, M.F. *Macromolecules* 1997, 30, 2712-2716.
Stockton, W.B.; Rubner, M.F. *Macromolecules* 1997, 30, 2717-2725.
Wang, L.Y.; Wang, Z.Q.; Zhang, X.; Shen, J.C.; Chi, L.F.; Fucks, H. *Macromol. Rapid Commun.* 1997, 18, 509-514.
Yoo, D.; Wu, A.; Lee, J-K.; Rubner, M.F. *Synthetic Metals* 1997, 85, 1425-1426.

* cited by examiner

*Primary Examiner*—Elena Tsoy
(74) *Attorney, Agent, or Firm*—Evan Law Group LLC

(57) ABSTRACT

A film contains a first polymer having a plurality of hydrogen bond donating moieties, and a second polymer having a plurality of hydrogen bond accepting moieties. The second polymer is hydrogen bonded to the first polymer.

37 Claims, No Drawings

POLYMER FILMS

RELATED APPLICATIONS

This application is a Divisional Application of U.S. patent application Ser. No. 09/715,870, filed Nov. 15, 2000, now U.S. Pat. No. 6,740,409, which is incorporated herein by reference.

FEDERALLY SPONSORED RESEARCH OR DEVELOPMENT

The subject matter of this application was in part funded by the Department of Energy (Grant No. DE-FG02-91ER45439). The government may have certain rights in this invention.

BACKGROUND

The present invention relates to polymer films, their assembly, and their controlled destruction.

Polymer films find wide-ranging uses, from non-linear optics to electronic coatings. One way to produce polymer films is through self-assembly of the films, layer-by-layer. This self-assembly relies on electrostatic charge, of alternating sign, in each layer; charges of opposite sign in each layer attract, directing the self-assembly process. The layers may be build up from a solution, and in the assembly process, molecules may become trapped between the layers.

It would be desirable to destroy the polymer films in a controlled fashion, to release the molecules trapped between the layers. Molecules, such as drugs or dyes, could be trapped in the polymer films during the assembly process, and then released during controlled destruction of the polymer films. However, the layers of known self-assembled polymer films contain alternating charge, and therefore any controlled method of destruction of these films would require eliminating or reducing charge on some or all of the layers, in order to overcome the electrostatic attraction that holds the layers together, and to do so is not practical.

BRIEF SUMMARY

In a first aspect, the present invention is a film including a first polymer, and a second polymer hydrogen bonded to the first polymer.

In a second aspect, the present invention is a film including a first polymer having a plurality of hydrogen bond donating moieties, and a second polymer having a plurality of hydrogen bond accepting moieties.

In a third aspect, the present invention is a method of forming a film, including contacting a surface with a first polymer having a plurality of hydrogen bond donating moieties, and contacting the surface with a second polymer having a plurality of hydrogen bond accepting moieties.

DETAILED DESCRIPTION

The present invention includes a polymer film in which the layers are held together by hydrogen bond formation between the layers. The formation of the hydrogen bonds drives a self-assembly process. The attraction of the layers to each other can be overcome by creating charge on at least some of the layers, the charge creating a repulsive force, or increasing the solubility of the polymers while in contact with a solvent. In the case of creating charge, when the repulsive force between layers exceeds the attractive force from the hydrogen bonds, the polymer film will be destroyed, releasing molecules trapped in the polymer film. Through control of environmental factors, the creation of charge on the layers can be controlled, allowing for controlled destruction of the polymer film, and thereby controlled release of molecules trapped in the film. Unlike films formed in the past, the films are not made of polymers which each contain charged groups of opposite signs; these past films used the electrostatic attraction of the oppositely charged groups to bond the polymers together into the films.

The polymers used to form the films of the present invention include up to three moieties: a hydrogen bond donor, a hydrogen bond acceptor, and optionally, a charge-forming group. Each polymer used must include at least a hydrogen bond donor or a hydrogen bond acceptor; preferably at least one of the polymers used in the film contains a charge-forming group. Preferably, the film is produced using two polymers, with one polymer containing hydrogen bond donors, and the other polymer containing hydrogen bond acceptors, and at least one of the two polymers containing charge-forming groups. In the alternate embodiment of three, or more polymers, each polymer must contain at least hydrogen bond donors or hydrogen bond acceptors; at least one of the polymers used must also contain a charge-forming group.

A hydrogen bond is a relatively weak secondary interaction between a hydrogen atom bound to a more electronegative atom and another atom that is also generally more electronegative than hydrogen and has one or more lone electron pairs, enabling it to act as a base. Hydrogen bonding has been extensively studied (see, for example, *"Advanced Inorganic Chemistry"* 5th ed., F. Albert Cotton and Geoffrey Wilkinson, pp.90-94 (John Wiley & Sons, 1988)).

Hydrogen bond donors are moieties that contain at least one hydrogen atom that may participate in hydrogen bond formation, and a more electronegative atom bound to the hydrogen atom. Examples of these moieties include, preferably, O—H and N—H, and less preferably, P—H, S—H. The moiety C—H may also, less preferably, be a hydrogen bond donor, when the carbon atom is bond to another atom through a triple bond, when the carbon atom is bound through a double bond to O, or when the carbon atom is bound to at least two atoms selected from O, F, Cl and Br.

Hydrogen bond acceptors are moieties that contain an atom more electronegative than hydrogen that also has a lone pair of electrons. Examples of these atoms include preferably N, O and F, and less preferably Cl, Br, I, S and P. Examples of hydrogen bond acceptor moieties include C=O, O—H, N—H, C—F, P=O and C≡N.

Charge forming structures are moieties that can develop charge when exposed to one or more environmental changes. Examples of environmental changes are a change in pH, a change in ionic strength, exposure to an electric field, or exposure to dissolved ions. Examples of moieties that can develop charge under changing pH conditions include acid or base moieties. Examples of moieties that can develop charge under exposure to an electric field include carboxylic acids. Examples of moieties that can develop charge under exposure to dissolved ions include crown ethers (upon exposure to certain alkali metal ions).

Polymers for use in the present invention include polymers containing hydrogen bond donors and/or hydrogen bond acceptors, for example polycarboxylic acids such polyacrylic acid and polymethacrylic acid; polynucleotides such as poly(adenylic acid), poly(uridylic acid), poly(cytidylic acid), poly (uridylic acid) and poly(inosinic acid); polymers of vinyl nucleic acids such as poly(vinyladenine); polyamino acids such as polyglutamic acid and poly(ε-N-carbobenzoxy-L- lysine); polyalcohols such as poly(vinyl alcohol); polyethers such as poly(ethylene oxide), poly(1,2-dimethoxyethylene), poly(vinylmethyl ether), and poly(vinylbenzo-18-crown-6); polyketones and polyaldehydes such as poly vinyl butyral and poly(N-vinyl-2-pyrrolidone); polyacrylamides such as polyacrylamide, polymethacrylamide and poly(N-isopropylacrylamide); polyamines such as poly(4-amine)styrene; polyesters such poly(cylohexane-1,4-dimethylene terephthalate) and polyhydroxy methyl acrylate; polyphosphazenes such as poly(bis(methylamino)phosphazene) and poly(bis(methoxyethoxyethoxy)phosphazene; polysaccharides such as carboxymethyl cellulose; and copolymers thereof.

Some examples of preferable pairs of polymer for forming films include those of the following types:

Type 1. Homopolymer of polycarboxylic acid, paired with the specified Polymer B.

| Polymer A | Polymer B |
| --- | --- |
| Polycarboxylic acid | Poly(ethylene oxide) |
| Polycarboxylic acid | Poly(1,2-dimethoxyethylene) |
| Polycarboxylic acid | Poly(vinylmethyl ether) |

In the above three examples of Polymer B, the motif of proton acceptance in hydrogen bonding, is O . . . HO.

| Polymer A | Polymer B |
| --- | --- |
| Polycarboxylic acid | Poly(N-vinyl-2-pyrrolidone) (PVP) |
| Polycarboxylic acid | Poly(vinyl alcohol) |
| Polycarboxylic acid | Polyacrylamide |
| Polycarboxylic acid | Poly(N-isopropylacrylamide) |
| Polycarboxylic acid | $(CH_2(NCOCH_3)CH_2)_x$ |

In the above five examples of Polymer B, the motif of proton acceptance, is NC=O . . . HO.

Films formed from these pairs of polymers may be dissolved (the films destroyed) at high pH or in dimethylsulfoxide (DMSO). A film formed from PMA-PVP is stable in tetramethylurea and dimethylformamide (DMF) and dissolves in dimethylacetamide, N-methylpyrrolidone and hexamethylphosphoric triamide. The stability of these films can also be affected by temperature; these films become more stable as the temperature increases in water, but are destabilized as the temperature increases in DMF.

Type 2. Multilayers that include crown ethers as one constituent.

| Polymer A | Polymer B |
| --- | --- |
| Polycarboxylic acid | Vinyl polymers containing crown ether groups (for example: Poly(vinylbenzo-18-crown-6)) |

This type of film is destroyed by either high or low pH, depending on the specific monovalent ion present in the environment. For example, there is strong sensitivity to the type of action present in the environment:

| pH of solution | Cation Present | Stability of Film |
| --- | --- | --- |
| low pH | Li (for example LiCl) | stable |
| low pH | Na (for example NaCl) | intermediate |
| low pH | K, Cs or Ba (for example KCl, CsCl, or $BaCl_2$) | dissolves |
| high pH | Li (for example LiOH) | dissolves |
| high pH | Na (for example NaOH) | dissolves |
| high pH | K or Cs (for example KOH or CsOH) | stable |

Type 3. Films that include, as one constituent, molecules containing P=O moieties. The motif of hydrogen bonding is P=O . . . HO.

| Polymer A | Polymer B |
| --- | --- |
| Polycarboxylic acid | —P=O containing polymers (for example polydimethyltetramethylenephosphoric triamide) |

For example, the above film dissolves in hexamethylphosphoric triamide.

Type 4. Multilayers that include amino acids as one constituent.

| Polymer A | Polymer B |
| --- | --- |
| Polyglutamic acid | Poly(vinyl alcohol) |
| Polyglutamic acid | Poly(ethylene oxide) |
| Poly(ε-N-carbobenzoxy-L-lysine) | Poly(ethylene oxide) |

Type 5. Films based on hydrogen bonding between synthetic polynucleotides or vinyl-type polymers containing nucleic acid bases.

| Polymer A | Polymer B |
| --- | --- |
| Poly(adenylic acid) | Poly(uridylic acid) |
| Poly(cytidylic acid) | Poly(inosinic acid) |
| Poly(vinyladenine) | Poly(uridylic acid) |

These nucleic acid polymers will also form films with naturally occurring RNA (ribonucleic acid), DNA (deoxynucleic acid), as well as synthetic polynucleotides.

The films may be formed on a surface, such as the surface of a monolithic solid, or particles. The film is formed by dissolving at least one of the polymers into a solvent, to form a solution. The solution is then contacted with the surface, and hydrogen bonding of the polymer with the surface forms a layer of the polymer on the surface. A solution of the second polymer is next contacted with the layer of the first polymer on the surface, forming hydrogen bonds between the polymers, and forming a film. The process of contacting the surface with a solution of the first polymer and then a solution of the second polymer may be repeated until a film of the desired thickness is formed. If more than two polymers are to be used to form the film, a solution of the additional polymers may be contacted with the growing film. If the amount of polymer in the solutions is more than enough to form a layer on the surface, the surface may be rinsed between applications with the different polymer solutions, or removed from the solution. Aerosol deposition is also possible. The environmental conditions under which the film is formed are selected so that there is insufficient charge on the charge-forming groups to prevent film formation, or insufficient charge to cause dissolution of the film. It is also possible to form the film by evaporating the first polymer onto a surface, followed by evaporation of the second polymer onto the surface, and repeating these steps until the desired thickness is achieved; this is possible when the polymers have a molecular weight of at most 5000 g/mol, more preferably at most 2000 g/mol.

Examples of materials, either as monolithic solids, or particles, which may be coated include semiconductors such as silicon or germanium, polymers such as polyethylene and TEFLON, ceramics such as glass or alumina, and minerals such as mica. The films may be coated onto a surface, with an agent contained in the film, which may be released at a later time by destruction of the film. Also, the films may be used to change the properties of the surface (surface roughness, reflectivity, color, hydrophobicity, chemical reactivity, etc.), and optionally, the original surface properties may be restored by destruction of the films.

Any agent can be included in the film, as long as it can be dissolved or dispersed in the solvent in which at least one of the polymers is dissolved, or if the molecule can be evaporated with one of the polymers. Examples of agents include dyes, fragrances, perfumes, surfactants, detergents, chemicals used in environmental remediation, and bioactive agents. The bioactive agents can be any physiologically or pharmacologically active substance or substances optionally in combination with pharmaceutically acceptable carriers and additional ingredients such as antioxidants, stabilizing agents, permeation enhancers, etc. The bioactive agents may be any of the agents that are known to be delivered to the body of a human or an animal (including insects), and plants, and that are preferentially soluble in water. These bioactive agents include drug agents, medicaments, vitamins, nutrients, fertilizers, pesticides, or the like. Included among the types of bioactive agents which meet this description are drug agents, proteins, peptides, genetic material, nutrients, vitamins, food supplements, spices, flavor enhancers, emollients, skin and hair conditioners, sex sterilants, fertility inhibitors and fertility promoters. Examples of drug agents include prochlorperzine edisylate, ferrous sulfate, aminocaproic acid, mecamylamine hydrochloride, procainamide hydrochloride, amphetamine sulfate, methamphetamine hydrochloride, benzamphetamine hydrochloride, isoproterenol sulfate, phenmetrazine hydrochloride, bethanechol chloride, methacholine chloride, pilocarpine hydrochloride, atropine sulfate, scopolamine bromide, isopropamide iodide, tridihexethyl chloride, phenformin hydrochloride, methylphenidate hydrochloride, theophylline cholinate and cephalexin hydrochloride.

Solvents for dissolving the polymers include any liquid in which the polymer has measurable solubility. Solvents include hydrocarbons such as pentane, hexane and toluene; alcohols such as methanol, ethanol, isopropanol and phenol; esters such butyl acetate; aldehydes and ketones such as formaldehyde, acetone and methyl ethyl ketone; dimethyl sulfoxide; carbonates such as propylene carbonate; N-methyl formamide, tetramethylurea, dimethylacetamide, N-methylpyrrolidone, hexamethylphosphoric triamide and dimethyl formamide; supercritical fluids such as carbon dioxide; and preferably water; and mixtures thereof.

The films may be destroyed in order to release the agent trapped in the film so that the agent may carry out its own effect (such as in the case of a dye or bioactive agent), or to simply release the polymers of the film into a solution (for example, to change the viscosity of the solution). Furthermore, the films may be used to coat particles, allowing for controlled release of the one or more substances contained in the particles. If one or more of the polymers included in the film contain charge-forming groups, then forming sufficient charge in these groups to overcome the strength of the hydrogen bonding will cause the film to decompose. For example, adjusting the pH of the solution, applying an external electric field, or supplying specific ions, may be used depending on the specific charge-forming groups present. Alternative, heating or the addition of solvents may be sufficient to cause the film to dissolve or decompose, especially in the case where there are no charge-forming groups present in the polymers of the film.

EXAMPLES

Example 1

Polyethylene oxide (PEO) (weight-average molecular weight $M_w$=594,000, ratio of weight to number-average molecular weight $M_w/M_n$=1.03) was caused to form hydrogen-bonded multilayers with either polymethacrylic acid (PMA) ($M_w$=327 000, $M_w/M_n$=1.03) or polyacrylic acid (PM) ($M_w$=164 000, $M_w/M_n$=1.13). Solutions were prepared from the polymers, in water, at a concentration of 1 mg/ml or 0.5 mg/ml. The pH of the solutions was adjusted to 2.5 by the addition of aqueous HCl. These layers were deposited at pH<2.5, such that the PMA or PM were uncharged. The films were formed by alternately dipping the surfaces into each of the solutions, or in the case of germanium (and, likewise, a film on a silicon surface is preferably also so formed) the films were formed by applying one of the solutions to the surface, allowing about 20 minutes to adsorb the polymer, then rinsing with water adjusted with aqueous HCl to a pH of 2.5, followed by the second solution, also allowing about 20 minutes for the polymer to adsorb. This process was repeated 10-20 times until the desired film thickness was achieved. Heavy water was used in this example, so that IR spectroscopy could be used to identify hydrogen bonding and to quantify the amount of polymer adsorbed.

The films were formed on either glass, Teflon or germanium surfaces. Prior to deposition, the glass was made hydrophobic by treatment with octadecyltriethoxysilane. The Teflon surface was not treated prior to deposition.

The germanium surface (and, likewise, a silicon surface is preferably also so treated) was pretreated by being contacted with a solution of poly-4-vinylpyridine (98% quartenized with methyl iodide, with a degree of polymerization of 340, a concentration of 0.2 mg/ml, and having a pH of 9.2), and the polymer was allowed to adsorb. The solution was then replaced with a Na borate buffer (concentration $10^{-2}$ molar, pH of 9.2), followed by the above described solutions of PMA or PAA adjusted to a pH of 9.2. The surface was again contacted with the Na borate buffer, followed by the above described solution of PEO.

The layers were destroyed at pH=5.1-5.3 in the case of PMA-PEO multilayers and at pH=4.1-4.3 in case of PAA-PEO multilayers. These were circumstances in which PMA or PAA became 3 to 7% ionized.

Furthermore, the stability and integrity of these layers were controlled by varying concentration of salts. The PEO-PMA layers remain stable at pH=5.2 if ionic strength was raised to 0.4 M NaCl, though ionization of PMA increases up to 13%.

It was also demonstrated that stability of PMA-PEO layers may be regulated by applying an external electric field at pH=5.0. The films were destroyed after application of −1 V to a germanium (Ge) electrode (which served as a substrate for film deposition), and became stable after the sign of the applied voltage was switched to positive.

Example 2

Polyvinylpyrrolidone (PVP) ($M_w$~1,300,000 and also $M_w$~55,000) were caused to form hydrogen-bonded multilayers with PMA by sequential self-assembly using the process described in Example 1, except using PVP instead of PEO. The layers were deposited at pH<2.5. The deposition produces thinner single layers than in Example 1, which are organized in more regular films. Compared to PMA-PEO or PM-PEO layers, these films are stable up to a higher pH. Varying molecular weight of the polymers affords additional control of the layer stability. Films were stable to pH=6.5 in case of PVP with Mw=55,000 and to pH=7.0 in case of PVP with Mw=1,300,000.

Example 3

A dye, Rhodamine 6G, was incorporated into PMA-PEO layers. Larger quantities were incorporated, because this dye is cationic, at pH=4 than at pH=2. These experiments demonstrate the ability to release items such as dye, drug, pesticide, or other charged complexes when the films described in this disclosure are rendered unstable.

The invention claimed is:

1. A method of removing a film from a surface, comprising:
   providing a film on a surface, the film comprising a first layer including a first polymer having a plurality of hydrogen bond donating moieties, and a second layer including a second polymer having a plurality of hydrogen bond accepting moieties; and
   subjecting the film to an environmental change selected from a change in pH, a change in ionic strength, exposure to an electric field, or exposure to dissolved ions; wherein said environmental change is of a sufficient magnitude to cause the film to be removed from the surface.

2. The method of claim 1, wherein at least one of said first polymer and said second polymer comprise a plurality of charge-forming groups.

3. The method of claim 2, wherein said charge-forming groups are selected from the group consisting of acids and bases.

4. The method of claim 2, wherein said hydrogen bond donating moieties are selected from the group consisting of O—H, N—H, P—H and S—H; and wherein said hydrogen bond accepting moieties are selected from the group consisting of C=O, O—H, N—H, C—F, P=O and C≡N.

5. The method of claim 4, wherein said charge-forming groups are selected from the group consisting of acids and bases; and wherein said first polymer or said second polymer comprises carboxylic acid groups.

6. The method of claim 2, wherein the subjecting provides for the formation of charge on at least a portion of the charge-forming groups.

7. The method of claim 6, wherein the subjecting further provides for a repulsive force between the first polymer and the second polymer.

8. The method of claim 1, wherein the film is in contact with a solvent, and the subjecting provides for an increase in the solubility of at least one of the first and second polymers in the solvent.

9. The method of claim 1, wherein the surface is on a particle.

10. A method of removing a film from a surface, comprising:
    providing a film on a surface, the film comprising a first layer including a first polymer, and a second layer including a second polymer, the second polymer hydrogen bonded to the first polymer; and
    subjecting the film to an environmental change selected from a change in pH, a change in ionic strength, exposure to an electric field, or exposure to dissolved ions; wherein said environmental change is of a sufficient magnitude to cause the film to be removed from the surface.

11. The method of claim 10, wherein at least one of said first polymer and said second polymer comprise a plurality of charge-forming groups.

12. The method of claim 11, wherein said charge-forming groups are selected from the group consisting of acids and bases.

13. The method of claim 12, wherein said first polymer or said second polymer comprises carboxylic acid groups.

14. The method of claim 13, wherein said first polymer and said second polymer do not contain first and second oppositely charged groups, respectively.

15. The method of claim 11, wherein the subjecting provides for the formation of charge on at least a portion of the charge-forming groups.

16. The method of claim 15, wherein the subjecting further provides for a repulsive force between the first polymer and the second polymer.

17. The method of claim 10, wherein the film is in contact with a solvent, and the subjecting provides for an increase in the solubility of at least one of the first and second polymers in the solvent.

18. The method of claim 10, wherein the surface is on a particle.

19. A method of releasing an agent from a film into an environment, comprising:
    providing a film comprising
       a first layer including a first polymer having a plurality of hydrogen bond donating moieties,
       a second layer including a second polymer having a plurality of hydrogen bond accepting moieties, and
       an agent; and
    subjecting the film to an environmental change selected from a change in pH, a change in ionic strength, exposure to an electric field, or exposure to dissolved ions; wherein said environmental change is of a sufficient magnitude to cause the agent to be released from the film.

20. The method of claim 19, wherein the subjecting the film provides for removal of at least one of the first and second layers.

21. The method of claim 19, wherein at least one of said first polymer and said second polymer comprise a plurality of charge-forming groups, and the subjecting provides for the formation of charge on at least a portion of the charge-forming groups.

22. The method of claim 21, wherein the subjecting further provides for a repulsive force between the first polymer and the second polymer.

23. The method of claim 19, wherein the film is in contact with a solvent, and the subjecting provides for an increase in the solubility of at least one of the first and second polymers in the solvent.

24. The method of claim 19, wherein the film is on a surface.

25. The method of claim 24, wherein the surface is on a particle.

26. The method of claim 24, wherein the subjecting the film provides for removal of at least a portion of the film from the surface.

27. The method of claim 19, wherein the first polymer and the second polymer are held together through hydrogen bonds prior to the subjecting.

28. The method of claim 19, wherein the agent is present between the first and second layers.

29. The method of claim 19, wherein the agent is present in at least one of the first and second layers.

30. The method of claim 19, wherein the agent is selected from the group consisting of dyes, fragrances, perfumes, surfactants, detergents, chemicals used in environmental remediation, and bioactive agents.

31. The method of claim 19, wherein the agent comprises a bioactive agent selected from the group consisting of drug agents, medicaments, vitamins, nutrients, fertilizers, pesticides, proteins, peptides, genetic material, food supplements, spices, flavor enhancers, emollients, skin and hair conditioners, sex sterilants, fertility inhibitors and fertility promoters.

32. The method of claim 31, further comprising exposing the film to at least a portion of an organism prior to subjecting the film to an environmental change; wherein the subjecting provides for delivery of the bioactive agent to the organism.

33. The method of claim 19, wherein the providing the film comprises contacting a surface with a solution of the first polymer; and contacting the surface with a solution of the second polymer.

34. The method of claim 33, wherein at least one of the solution of the first polymer and the solution of the second polymer comprises the agent.

35. The method of claim 33, further comprising repeating the contacting the surface with the solution of the first polymer and contacting the surface with the solution of the second polymer at least once.

36. The method of claim 19, wherein the providing the film comprises contacting a surface with a solution of the first polymer; contacting the surface with the agent; and contacting the surface with a solution of the second polymer.

37. The method of claim 36, further comprising repeating the contacting the surface with the solution of the first polymer, contacting the surface with the agent, and contacting the surface with the solution of the second polymer at least once.

* * * * *